United States Patent
Oberhoffer et al.

(10) Patent No.: US 10,227,671 B2
(45) Date of Patent: *Mar. 12, 2019

(54) METHOD FOR PRODUCING A CORROSION-RESISTANT STEEL SHEET

(71) Applicant: THYSSENKRUPP RASSELSTEIN GMBH, Andernach (DE)

(72) Inventors: Helmut Oberhoffer, St. Johann (DE); Anika Szesni, Kettig (DE); Manuel Köhl, Mendig (DE); Dimitrios Nouskalis, Burgbrohl (DE); Reiner Sauer, Heimbach-Weis (DE)

(73) Assignee: THYSSENKRUPP RASSELSTEIN GMBH, Andernach (DE)

( * ) Notice: Subject to any disclaimer, the term of this patent is extended or adjusted under 35 U.S.C. 154(b) by 734 days.

This patent is subject to a terminal disclaimer.

(21) Appl. No.: 14/770,184

(22) PCT Filed: Oct. 14, 2013

(86) PCT No.: PCT/EP2013/071399
§ 371 (c)(1),
(2) Date: Aug. 25, 2015

(87) PCT Pub. No.: WO2014/127858
PCT Pub. Date: Aug. 28, 2014

(65) Prior Publication Data
US 2016/0002748 A1    Jan. 7, 2016

(30) Foreign Application Priority Data
Feb. 25, 2013   (DE) .................. 10 2013 101 847

(51) Int. Cl.
*C21D 1/26*    (2006.01)
*C21D 1/42*    (2006.01)
(Continued)

(52) U.S. Cl.
CPC ............... *C21D 9/46* (2013.01); *C21D 1/26* (2013.01); *C21D 6/004* (2013.01); *C21D 6/005* (2013.01);
(Continued)

(58) Field of Classification Search
None
See application file for complete search history.

(56) References Cited

U.S. PATENT DOCUMENTS 3,174,917 A * 3/1965 Lesney ................... C23C 10/28
 205/170
3,313,907 A    4/1967 Geisel et al.
(Continued)

FOREIGN PATENT DOCUMENTS

BE    1008976    10/1996
CH    469810    3/1969
(Continued)

OTHER PUBLICATIONS

Written Opinion dated Aug. 25, 2015 for PCT/EP2013/071399 filed Oct. 14, 2013.
(Continued)

*Primary Examiner* — Colin W. Slifka
(74) *Attorney, Agent, or Firm* — Paul D. Bianco; Gary S. Winer; Fleit Gibbons Gutman Bongini & Bianco PL

(57) ABSTRACT

A method for producing a corrosion-resistant steel sheet made of an unalloyed or low-alloy and cold-rolled steel having a carbon content of less than 0.1 wt %. The method includes the following steps: applying a metal coating to the steel sheet; annealing the coated steel sheet in a recrystallizing manner by heating the coated steel sheet to temperatures in the recrystallization range by electromagnetic induction in an inert-gas atmosphere; and quenching the coated
(Continued)

and annealed steel sheet. The metal coating is fused on during the recrystallization annealing.

19 Claims, 2 Drawing Sheets

(51) Int. Cl.
| | |
|---|---|
| C21D 1/74 | (2006.01) |
| C21D 6/00 | (2006.01) |
| C21D 9/46 | (2006.01) |
| C22C 38/00 | (2006.01) |
| C22C 38/02 | (2006.01) |
| C22C 38/04 | (2006.01) |
| C22C 38/06 | (2006.01) |
| C22C 38/42 | (2006.01) |
| C22C 38/44 | (2006.01) |
| C22C 38/46 | (2006.01) |
| C22C 38/48 | (2006.01) |
| C22C 38/50 | (2006.01) |
| C22C 38/54 | (2006.01) |
| C23F 17/00 | (2006.01) |
| C25D 3/30 | (2006.01) |
| C25D 7/00 | (2006.01) |
| C23C 2/28 | (2006.01) |
| C21D 9/52 | (2006.01) |
| C21D 8/02 | (2006.01) |
| C21D 9/60 | (2006.01) |

(52) U.S. Cl.
CPC ............... *C21D 6/008* (2013.01); *C21D 9/52* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C23C 2/28* (2013.01); *C23F 17/00* (2013.01); *C25D 3/30* (2013.01); *C25D 7/00* (2013.01); *C21D 1/42* (2013.01); *C21D 1/74* (2013.01); *C21D 8/0273* (2013.01); *C21D 9/60* (2013.01); *C21D 2211/005* (2013.01); *C21D 2211/008* (2013.01); *Y02P 10/253* (2015.11)

(56) References Cited

U.S. PATENT DOCUMENTS

| | | | | |
|---|---|---|---|---|
| 3,772,091 | A | * | 11/1973 | Mayer .................. C21D 8/0236 148/518 |
| 6,231,695 | B1 | | 5/2001 | Heiler et al. |
| 2010/0000634 | A1 | | 1/2010 | Spehr et al. |
| 2015/0010779 | A1 | * | 1/2015 | Szesni ..................... C21D 9/52 428/684 |

FOREIGN PATENT DOCUMENTS

| | | |
|---|---|---|
| DE | 1177896 | 9/1964 |
| DE | 1186158 | 1/1965 |
| DE | 1277896 | 9/1968 |
| DE | 1813923 | 10/1969 |
| DE | 19646362 | 5/1998 |
| DE | 10 2006 054 300 | 5/2008 |
| GB | 1057530 | 9/1965 |
| JP | S5974231 | 4/1984 |

OTHER PUBLICATIONS

International Preliminary Report on Patentability dated Aug. 25, 2015 for PCT/EP2013/071399 filed Oct. 14, 2013.
International Search Report dated Nov. 28, 2013 for PCT/EP2013/071399, filed Oct. 14, 2013.
Result of examination report for German Application No. 10 2013 101 847.5, filed Feb. 25, 2013.
Machine Translation of Specification and Claims of Belgian Patent Publication No. BE1008976, available at https://worldwide.espacenet.com/, published Oct. 1, 1996.

* cited by examiner

METHOD FOR PRODUCING A CORROSION-RESISTANT STEEL SHEET

FIELD OF THE INVENTION

The invention concerns a method for the production of a corrosion-resistant steel sheet made from an unalloyed or low-alloy and cold-rolled steel with a carbon content of less than 0.1 wt % for use as packaging steel.

BACKGROUND OF THE INVENTION

From CH 469 810, a thin-walled steel product in sheet or strip form and a method for its production is known, which can be used for the production of tinplate with a higher strength. The steel product is produced from an unalloyed steel with a carbon content of 0.03-0.25 wt % and has a manganese content of 0.2-0.6 wt % and a silicon content of less than 0.011 wt %. The steel product is characterized by a fine structure consisting at least partially of martensite and ferrite and has tensile strengths of at least 6328 kg/cm$^2$ and an elongation at break of at least 1.5%. For the formation of these characteristics, the steel product is first heated in a furnace to a temperature above the $A_1$ point and subsequently is quenched in a water bath. The tinning of this steel product is then carried out in a known manner after the heating and the quenching of the steel strip in an electrolytic tinning path.

Increasingly, there are higher requirements for the characteristics of metal materials for the production of packagings, in particular with regard to their formability and their strength and their corrosion resistance. So-called dual-phase steels are known from automobile construction, which have a multiphase structure, which essentially consists of martensite and ferrite or bainite, and which, on the one hand, have a high tensile strength and, on the other hand, also have a high elongation at break. Such a dual-phase steel with a yield strength of at least 580 mPa and an elongation at break $A_{80}$ of at least 10% is, for example, known from WO 2009/021898 A1. As a result of the combination of material characteristics of such dual-phase steels with a high strength and a good formability, these dual-phase steels are particularly suitable for the production of complex-formed and highly stressable components, as they are required, for example, in the area of the chassis for automobiles.

The alloy of the known dual-phase steels is, as a rule, composed of a martensite fraction of 20% to 70%, and any residual austenite fraction and ferrite and/or bainite. The good formability of dual-phase steels is guaranteed by a relatively soft ferrite phase and the high strength is produced by the solid martensite and bainite phases, bound in a ferrite matrix. The desired characteristics with regard to formability and strength can be controlled within broad ranges by the alloy composition of dual-phase steels. Thus, for example, by adding silicon, the strength can be increased by hardening the ferrite or the bainite. By adding manganese, the martensite formation can be positively influenced and the formation of perlite can be prevented. Also, the additives of aluminum, titanium, and boron can increase the strength. The additive of aluminum is, moreover, used for the deoxidation and the binding of nitrogen that may be contained in the steel. For the formation of the multiphase alloy structure, dual-phase steels are subjected to a recrystallizing (or austenitizing) heat treatment, in which the steel strip is heated to such temperatures and subsequently cooled that the desired multiphase alloy structure is adjusted with an essentially ferrite-martensite structure formation. Usually, cold-rolled steel strips are annealed in a recrystallizing manner in a continuous annealing process in the annealing furnace, wherein the parameters of the annealing furnace, such as throughput speed, annealing temperature, and cooling rate, are adjusted in accordance with the required structure and the desired material characteristics.

From DE 10 2006 054 300 A1, a more resistant dual-phase steel and a method for its production are known, wherein a cold- or hot-rolled steel strip is subjected, in the production process, to a recrystallizing continuous annealing in a continuous annealing furnace in a temperature range of 820° C. to 1000° C., and the annealed steel strip is subsequently cooled from this annealing temperature at a cooling rate between 15 and 30° C. per second.

For use as packaging steel, the dual-phase steels known from automobile construction are not suitable as a rule, because they are very expensive, in particular as a result of the high fractions of alloy elements, such as manganese, silicon, chromium, and aluminum, and because for the use of packaging steel in the food sector, for example, some of the known alloy elements may not be used, since a contamination of the food by diffusion of the alloy components into the filler in packages must be ruled out. Furthermore, many of the known dual-phase steels have such a high strength that they cannot be cold-rolled with the systems usually used for the production of packaging steel.

Moreover, packaging steel must have a high corrosion resistance and a good resistance with respect to acids, since the contents of packages made of packaging steel, such as beverage and food cans, are frequently acidic. Packaging steel, therefore, has a metal coating as a protective layer for corrosion, for example, made of tin. The quality of this corrosion protection layer depends, in a very essential manner, on its adhesive capacity on the steel sheet surface. For the improvement of the corrosion resistance of the coating and the adhesion of the corrosion protective layer on the steel sheet surface, for example, in the production of tinplate (tin-plated steel sheet), the tin coating applied on the steel sheet galvanically is melted after the coating process. To this end, the coating deposited galvanically on the steel strip is heated to a temperature lying only slightly above the melting point of the coating material (with a tin coating, for example, to 240° C.) and subsequently is quenched in a water bath. By the melting of the tin coating, the surface of the coating receives a shiny appearance and the porosity of the iron-tin alloy layer between the coating and the steel strip is reduced, wherein its corrosion resistance is increased and its permeability for aggressive substances, for example, organic acids, is reduced.

The melting of the coating can, for example, be carried out by the inductive heating of the coated steel strip or by electrical resistance heating. DE 1 186 158-A, for example, discloses an arrangement for the melting of especially the electrolytically applied coatings on steel strips. From DE 1 177 896, a method for increasing the corrosion protection of metalized iron strips or sheets is known, in which the metal coating, which is especially made of tin, is melted by increasing to a temperature above the melting temperature of the coating material and is exposed, during the crystallization process in the coating material, in the range between the melting temperature and recrystallizing temperature of the coating material, to higher-frequency vibrations. In this way, a crystallization of the coating, which is recognized as disadvantageous, is avoided.

In the known methods for the melting of metal coatings on steel strips or sheets, the entire steel strip or sheet, including the applied coating, is, as a rule, heated to temperatures

«END» above the melting temperature of the coating material and subsequently cooled again to normal temperatures, for example, in a water bath. For this, a considerable energy demand is necessary. Since, for the restoration of its original structural state and for the improvement of its formability, the cold-rolled steel strip or sheet must be annealed in a recrystallizing manner before the coating, a heating of the entire steel sheet is carried out twice in the known processes for the production of metal-coated steel sheets—namely, first during the recrystallization annealing of the cold-rolled and still uncoated steel sheet and then after its coating with a metal corrosion protective layer for the melting of the applied coating. This heating of the steel sheet twice thereby takes a large amount of energy and considerably increases the cost of the production process.

SUMMARY OF THE INVENTION

One embodiment of the invention relates to as energy-efficient a method as possible for the production of a more resistant packaging steel with a good formability and a high corrosion resistance.

Preferred embodiment examples of the method are also disclosed.

Proceeding from this, the goal of the invention is to indicate as energy-efficient a method as possible for the production of a more resistant packaging steel with a good formability and a high corrosion resistance.

These goals are attained with a method with the features of claim 1. Preferred embodiment examples of the method are indicated in the dependent claims.

In the method in accordance with the invention, a metal coating is applied on a steel sheet in a first step and the coated steel sheet is subsequently (and preferably without other intermediate steps) subjected to recrystallization annealing in a second step, wherein the steel sheet is heated to temperatures in the recrystallization range in an inert gas atmosphere by means of electromagnetic induction, wherein the metal coating melts. In a third step, which appropriately follows the second step directly and without other intermediate steps, the coated and annealed steel sheet is quenched.

The steel sheet in accordance with the invention is produced from an unalloyed or low-alloy and cold-rolled steel with a carbon content of less than 0.1%. When a steel sheet is discussed in the following, then this is also understood as a steel strip. Appropriately, the steel sheet is a fine or very fine sheet that has been rolled to its final thickness in a cold-rolling process. A fine sheet is understood to be a sheet with a thickness of less than 3 mm and a very fine sheet has a thickness of less than 0.5 mm. The steel sheet in accordance with the invention is appropriately characterized by, in addition to the low carbon content, the low concentrations of the other alloy components also. The steel used for the production of the steel sheet in accordance with the invention has, in particular, less than 0.5 wt %, and preferably less than 0.4 wt % manganese, less than 0.04 wt % silicon, less than 0.1 wt % aluminum, and less than 0.1 wt % chromium. The steel can contain alloy additives of boron and/or niobium and/or titanium in order to increase the strength, wherein the additive of boron is appropriately in the range of 0.001-0.005 wt % and the alloy of niobium or titanium, in the range of 0.005-0.05 wt %. Preferably, however, weight fractions of Nb<0.03%.

The cold-rolled steel sheet is coated (before the recrystallization annealing) with a metal corrosion protective layer, which is preferably made of a metal with a melting temperature below 700° C. The coating materials that can therefore be taken into consideration are, in particular, tin (with a melting temperature of approximately 232° C.), zinc (with a melting temperature of approximately 419°) and aluminum (with a melting temperature of approximately 660° C.). The metal coating is appropriately applied electrolytically on one or both main surfaces of the steel sheet.

For the formation of a multiphase alloy structure and for the melting of the applied coating, the coated steel sheet is then subjected to a recrystallization annealing first and then quenched after the recrystallization annealing. In order to guarantee both the recrystallization annealing of the steel and also the melting of the metal coating in a single heating step, the coated steel sheet is thereby heated to temperatures which are above the melting temperature of the metal coating and within the recrystallization range of the steel used. Since the (lower) recrystallization temperatures of steel are, as a rule, between 550° C. and 750° C. and thus above the melting temperature of the metal coating (with tin, for example, approximately 232° C.), the coating is automatically melted during the recrystallization annealing. By the melting of the coating, the corrosion resistance of the coated steel sheet and the adhesion of the coating on the steel sheet surface are improved.

Preferably, the steel strip is heated during the recrystallization annealing by means of electromagnetic induction, at a high heating rate of more than 75 K/s, and preferably of more than 100 K/s, to temperatures higher than 700° C. In a surprising manner, it has been shown that, in this way, a multiphase structure that is advantageous for the creation of a high resistance can be produced in the steel used for the cold-rolled steel sheet. The recrystallization annealing is appropriately carried out at temperatures above the A1 conversion point. By means of a recrystallizing heat treatment with a maximum temperature of $T_{max}>Ac1$, an austenitizing of the steel takes place and the subsequent rapid cooling forms a multiphase structure in the steel, which comprises ferrite and at least one of the structure components martensite, bainite, and/or residual austenite.

The quenching likewise takes place at a high cooling rate, so as to increase the hardening in the steel. Preferably, after the recrystallization annealing, the steel sheet is cooled at a cooling rate of at least 100 K/s, and with particular preference, a rate of more than 500 K/s. The steel sheet thus treated has a tensile strength at break of at least 500 mPa and an elongation at break of more than 6%.

The recrystallization (or austenitizing) annealing of the coated steel sheet by means of electromagnetic induction has proved to be particularly suitable for the production of the packaging steel in accordance with the invention. It was surprisingly determined that one can dispense with the addition of alloy components that are typically contained in dual-phase steels, such as the addition of manganese (which typically has a weight fraction of 0.8-2.0% in the known dual-phase steels), silicon (which typically has a weight fraction of 0.1-0.5% in the known dual-phase steels), and aluminum (which has an added weight fraction of up to 0.2% in the known dual-phase steels), if a cold-rolled steel sheet with a carbon content of less than 0.1 wt % is first subjected to a recrystallization (or austenitizing) annealing at a heating rate of more than 75 K/s by means of electromagnetic induction and is subsequently quenched at a high cooling rate of at least 100 K/s.

The surprisingly observed influence of the inductive heating on the formation and the arrangement of the martensite phase in the induction-annealed steel sheet could be explained as follows: Ferromagnetic substances are not magnetized in the absence of an external magnetic field.

However, there are sections (white sections) in the interior of these substances that are also magnetized, up to saturation, in the absence of external magnetic fields. The white sections are separated by Bloch walls. By applying an external magnetic field, the favorably oriented and therefore energetically preferred white sections initially grow at the expense of the adjoining areas. The Bloch walls are thereby displaced. The inhibition of the electron spin does not thereby take place simultaneously, but rather the spins alternate their direction first on the limits of the white sections. With a further increase in the field, the direction of the magnetization rotates into that of the field until it coincides with that of the external magnetic field in all sections and the saturation is attained. It is also known that a magnetic field can influence the movement of displacements without external mechanical tensions. It then appears plausible that with their displacement, the Bloch walls take along carbon atoms and/or displacements. In this way, carbon and/or displacements accumulate in certain sections in which martensite is subsequently formed after annealing and quenching.

To avoid dark colorations on the surface of the coating, which can form due to oxidation, the recrystallization annealing and the melting of the metal coating are carried out, in accordance with the invention, in an inert gas atmosphere. To this end, the coated steel sheet is appropriately conducted through an inert gas channel and impinged on with an inert gas during the recrystallization annealing.

BRIEF DESCRIPTION OF THE DRAWINGS

The invention is explained in more detail below with the aid of an embodiment example, with reference to the accompanying drawings. The drawings show the following.

DETAILED DESCRIPTION OF THE INVENTION

For the production of the steel sheets in accordance with the invention for use as packaging steel, steel strips made in a continuous casting process and hot-rolled and wound on coils, with the following composition, were used:
C: maximum 0.1%;
N: maximum 0.02%;
Mn: maximum 0.5%, preferably less than 0.4%;
Si: maximum 0.04%, preferably less than 0.02%;
Al: maximum 0.1%, preferably less than 0.05%;
Cr: maximum 0.1%, preferably less than 0.05%;
P: maximum 0.03%;
Cu: maximum 0.1%;
Ni: maximum 0.1%;
Sn: maximum 0.04%;
Mo: maximum 0.04%;
V: maximum 0.04%;
Ti: maximum 0.05%, preferably less than 0.02%;
Nb: maximum 0.05%, preferably less than 0.02%;
B: maximum 0.005%;
and other alloy components and impurities: maximum 0.05%;
the remainder iron.

Figure 1:
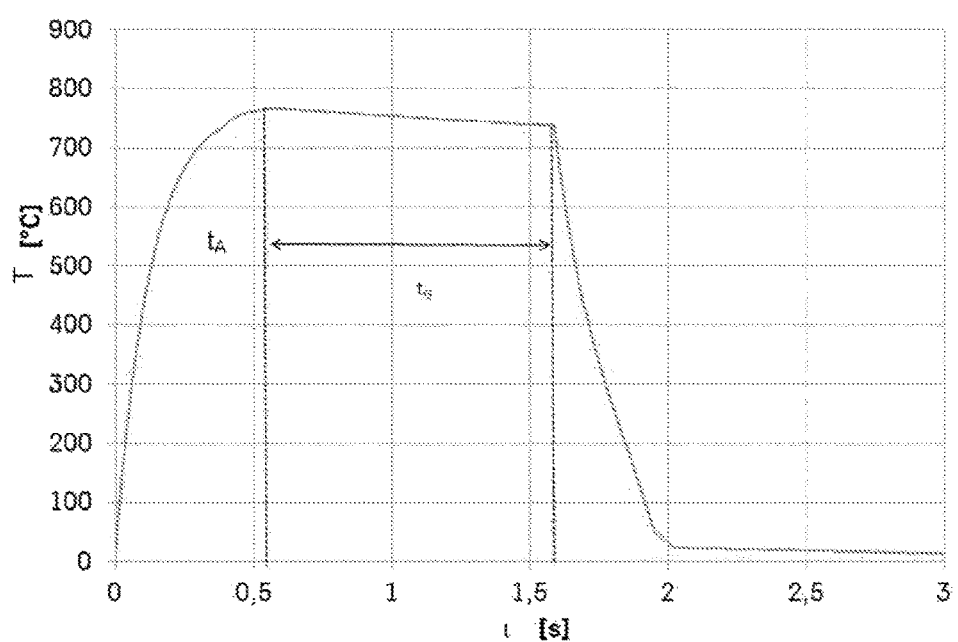
FIG. 1: annealing curve for the recrystallization annealing of the coated steel sheet in the method in accordance with the invention.

This steel sheet was first cold-rolled, with a thickness reduction of 50% to 96%, to an end thickness in the range of approximately 0.5 mm and subsequently, electrolytically provided with a tin coating in a strip tinning facility. After the coating process, the coated steel sheet was subjected to recrystallization annealing by induction heating in an induction furnace. An induction coil with a power of 50 kW and a frequency of f=200 kHz was used here, for example, for a sample size of 20×30. The annealing curve is shown in FIG. 1. As can be seen from the annealing curve of FIG. 1, the steel strip was heated to a maximum temperature $T_{max}$ above the $A_1$ temperature (T ($A_1$)=725° C.), within a very short heating time $t_A$, which is typically between approximately 0.5 s and 10 s. The maximum temperature $T_{max}$ is appropriately below the phase transition temperature $T_f$ of the ferromagnetic phase transition ($T_f$=770° C.). The temperature of the steel strip was then maintained at a temperature value above the $A_1$ temperature, over an annealing period $t_G$ of approximately 1 second. During this annealing period $t_G$, the steel strip was cooled slightly from a maximum temperature $T_{max}$ of, for example, 750° C. to the $A_1$ temperature (approximately 725° C.). During the annealing period, the tin coating of the steep sheet was melted.

Afterward, the steel strip was quenched by a rapid introduction into a quenching bath. The cooling of the steel strip can also take place by spraying water jets or by means of a gas cooling, which, for example, can be produced by an air cooling or by a jet cooling with inert gas. For the formation of the multiphase structure in the steel of the steel sheet, it is appropriate to make possible a rapid cooling to room temperature (approximately 23° C.) within a cooling interval of approximately 0.25 to 1.0 seconds. After the cooling, a finishing of the coated steel sheet can also take place if necessary.

By comparison trials, it was determined that with the execution of this process, dark colorations formed on the surface of the coated steel sheet, which are undesired for the intended use as a packaging steel. It became evident that the dark colorations are produced by the formation of iron oxide and tin oxide on the surface of the coated steel sheet. The iron oxide is thereby formed by a diffusion of the iron ions of the steel sheet through the tin coating and the reaction of the diffused iron ions with air on the surface of the tin coating. In order to avoid this oxide formation on the coating surface, the recrystallization annealing of the steel sheet and the melting of the coating take place, in accordance with the invention, in an inert gas atmosphere. For this, the coated steel sheet is appropriately conducted through an inert gas channel and impinged on with an inert gas during the recrystallization annealing.

Figure 2:
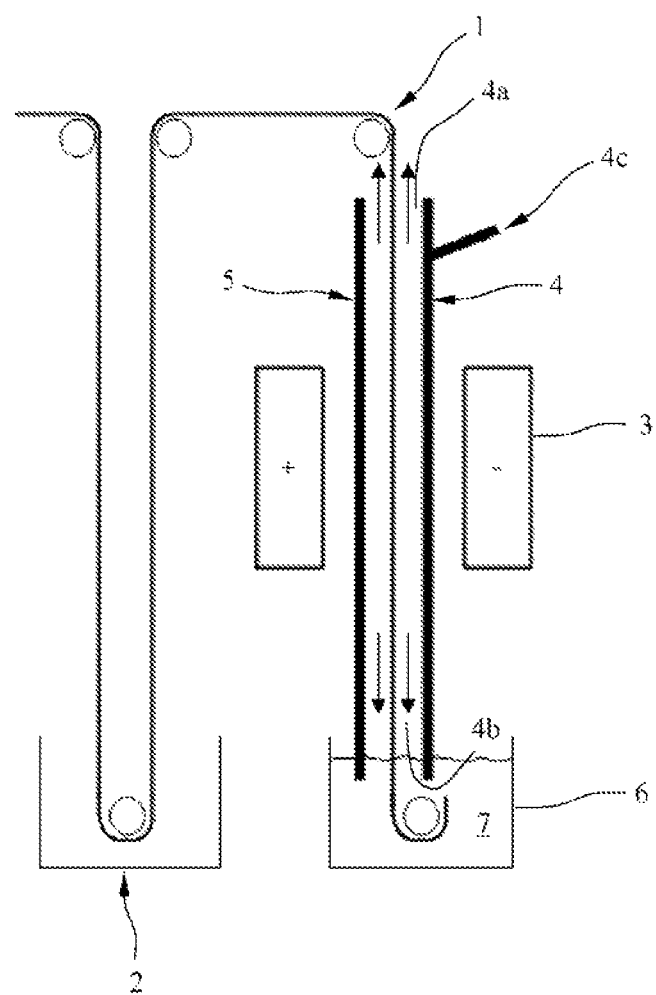
FIG. 2: schematic representation of a device for the carrying out of the method in accordance with the invention.

FIG. 2 schematically shows a device for carrying out the method in accordance with the invention. The strip-shaped steel sheet 1 is moved by a driving device, not depicted here, through a strip galvanic tinning facility 2, at a strip speed of at least 200 m/min and preferably more than 600 m/min, in which the steel sheet 1 is electrolytically coated on one or both sides with a tin coating. Following the strip tinning facility 2, there is an inductive annealing device with at least one induction coil 3, in which the coated steel strip 1 is subjected to recrystallization annealing. For the formation of an inert gas atmosphere during the recrystallization annealing, the steel strip 1 is annealed through an inert gas channel 4 at the strip speed. The inert gas channel 4 has a temperature-resistant channel wall 5, which is preferably made of a ceramic material and which has front-side openings 4a, 4b for the introduction or removal of the steel sheet 1 and at least one supply opening 4c for the introduction of an inert gas. The inert gas can be, for example, argon or nitrogen gas. It has become evident that the residual oxygen content in the inert gas channel 4 during the recrystallization annealing should be at most 20 ppm, and preferably below 15 ppm, in order to avoid the colorations on the surface of the coating. The induction coil 3 is situated around the inert gas channel 4; with it, the coated steel sheet can be inductively heated for the recrystallization annealing and the melting of the coating. Several induction coils, one behind the other in the strip travel direction, can also be situated around the inert gas channel 4. Following the inert gas channel 4, there is a quenching bath 6, which is filled with a cooling liquid 7, for example, water. The steel sheet 1 coming from the inert gas channel 4 is conducted into the quenching bath 6 for the rapid cooling. In order to prevent the penetration of air through the lower front-side opening 4b of the inert gas channel 4, the lower end of the inert gas channel 4 protrudes, with the lower opening 4b, into the cooling liquid 7. A penetration of air into the upper front-side opening 4a of the inert gas channel 4 is prevented by the excess of the inert gas, which is introduced through the supply opening 4c into the inert gas channel 4 and can flow out from there through the upper opening 4a.

It was determined that, due to the inert gas atmosphere, a diffusion of iron through the (tin) coating is prevented during the recrystallization annealing. In this way, dark iron oxide ($Fe_2O_3$) or iron/tin oxide ($FeO_xSn$) cannot form on the tin surface. Rather, due to the melting of the tin coating between the steel sheet surface and the molten tin coating, a thin (in comparison to the thickness of the tin coating) and dense Fe—Sn alloy layer is formed, which consists of iron and tin atoms. Depending on the method parameters, a thickness of the alloy layer can be attained that corresponds to an alloy layer of less than 0.5 g/m$^2$ or even less than 0.3 g/m$^2$. After the quenching in the quenching bath 6, the alloy layer forms a good barrier against air and acidic liquids diffusing in, and therefore increases the corrosion and acid resistance of the tinplate produced in accordance with the invention. The Fe—Sn alloy layer, furthermore, increases the adhesion of the coating on the steel sheet surface. By the melting of the coating during the recrystallization annealing, the porosity of the alloy layer is also reduced and thus increases its corrosion and acid resistance. Simultaneously, the melting of the coating leads to an improvement of the surface brilliance of the coating, since the originally matte surface of the coating becomes shiny due to the melting and rapid cooling.

The tinplate thus produced was investigated with respect to its strength and its elongation at break. By comparison trials, it was possible to show that in all cases, the elongation at break was higher than 6% and, as a rule, higher than 10%, and that the tensile strength exhibited at least 500 mPa, and in many cases, even in the range of 600 to 800 mPa.

By means of a color precipitation etching according to Klemm, it was possible to prove that the steel sheets produced in accordance with the invention have an alloy structure after the recrystallization annealing; it has ferrite as the soft phase and martensite and perhaps bainite and/or residual austenite as the hard phase.

By comparison trials, it was also possible to determine that the best results with regard to strength and formability are attained if the heating rate during the recrystallization annealing is between 200 K/s and 1200 K/s and if the steel strip annealed by recrystallization annealing is subsequently cooled at a cooling rate of more than 100 K/s. Appropriate to the apparatuses, cooling rates are hereby between 350 K/s and 1000 K/s, because then one can dispense with water or oil cooling, which are expensive with respect to the equipment, and the cooling can be carried out by means of a cool gas, such as air or an inert gas. The best results with respect to the material characteristics are, however, attained with quenching of the coated steel sheet in a quenching bath at cooling rates of more than 1000 K/s. Excessively high cooling rates, however, involve a risk of cracks and warping of the steel sheet during the quenching.

The steel sheet produced in accordance with the invention is excellent for use as packaging steel. Thus, for example, food or beverage cans can be made from the steel sheet in accordance with the invention that meet the high demands of corrosion and acid resistances required in the food sector for packagings. The coating of the steel sheet can thereby take place, according to requirements, on one or both sides.

In comparison to the dual-phase steels known from the automobile industry, the steel sheet in accordance with the invention for use as packaging steel is characterized, in particular, by the substantially lower production costs and by the advantage that the steel can be used with a lower alloy concentration and few alloy components, wherein contamination of the packaged food can be avoided. With regard to strength and formability, the steel sheet in accordance with the invention is comparable to the dual-phase steels known from automobile construction. The hard-rolled structure of the cold-rolled steel is converted by the recrystallization annealing into a multiphase structure, which has a high tensile strength and a good elongation at break.

Contrary to what is known, for example, with the known tinning process, the recrystallization annealing takes place only after the coating of the steel sheet with a metal coating. In a surprising manner, it has been shown that the metal coating in accordance with the invention (that is, for example, the tin coating) can be simultaneously melted with the recrystallization annealing without any impairment of the coating underneath. In spite of the comparatively high temperatures that must be maintained for the simultaneous recrystallization annealing of the steel sheet and the melting of the metal coating, with tinplate, for example, a complete alloying of the coating material (tin) with the iron of the steel sheet and/or a complete oxidation of the coating material are not observed. Contrary to the expectation after the recrystallization annealing of the steel block coated with tin, there is still free tin left over, which can fulfill the known and advantageous characteristics of tinplate (as its good sliding friction, the weldability, and the high optical brilliance). Moreover, it has been shown that in spite of the comparatively high temperatures that are used in the melting of the tin coating and the simultaneous recrystallization annealing, a thin iron-tin alloy layer forms between the steel sheet surface and the tin layer, which considerably improves the corrosion and acid resistance of the product. These results can be correspondingly transferred to steel sheets that are coated with other metal coatings, for example, made of tin or aluminum. With the method in accordance with the invention, therefore, corrosion-resistant and more resistant steel sheets can be produced with a good elongation at break. The method in accordance with the invention proves to be very energy-efficient, because the structural transformation in the steel and the melting of the coating take place simultaneously in one single method step (recrystallization annealing with a subsequent quenching). The recrystallization annealing of the steel sheet can therefore take place in the coating facility (after the coating), and not, as is usual in the state of the art, outside the coating facility (before the coating) in a separate annealing step. This makes possible a streamlined process execution and reduces the equipment expense considerably. An (additional) recrystallizing heat treatment of the steel sheet before the coating process is not required in the method in accordance with the invention.

The invention claimed is:

1. A method for producing a corrosion-resistant steel sheet made of an unalloyed or low-alloy and cold-rolled steel with a carbon content of less than 0.1%, the method comprising the following steps:
applying a metal coating on the steel sheet;
recrystallization annealing of the coated steel sheet by heating to temperatures in the recrystallizing range by electromagnetic induction in an inert gas atmosphere, wherein the metal coating melts during the recrystallization annealing;
quenching of the coated and annealed steel sheet,
wherein after the recrystallization annealing, the coated steel sheet is quenched at a cooling rate of at least 100 K/s, wherein a multiphase structure is formed in the steel, which comprises ferrite and at least one of the structural components martensite, bainite, and/or residual austenite, and
wherein the metal coating is applied in a single step, and the recrystallization annealing occurs in a single step following the application of the metal coating.

2. The method according to claim 1, wherein the steel sheet is heated during the recrystallization annealing to temperatures higher than 550° C., at a heating rate of more than 75 K/s.

3. The method according to claim 2, wherein the steel sheet is heated during the recrystallization annealing to temperatures higher than 700° C., at a heating rate of more than 100 K/s.

4. The method according to claim 1 wherein the steel has
a manganese content of less than 0.4 wt %;
a silicon content of less than 0.04 wt %;
an aluminum content of less than 0.1 wt %;
and a chromium content of less than 0.1 wt %.

5. The method according to claim 1, wherein the multiphase structure consists of more than 80% of the structural components ferrite, martensite, bainite, and/or residual austenite.

6. The method according to claim 5, wherein the multiphase structure consists of at least 95% of the structural components ferrite, martensite, bainite, and/or residual austenite.

7. The method according to claim 1, wherein the steel sheet is made of a low-alloy steel, which contains at least one of boron, niobium and titanium.

8. The method according to claim 1, wherein the steel sheet is a cold-rolled fine or very fine sheet.

9. The method according to claim 1, wherein the coated steel sheet is heated during the recrystallization annealing to temperatures above the $A_1$ conversion point of the steel used.

10. The method according to claim 1, wherein, after the recrystallization annealing, the steel sheet is quenched by introduction of the steel sheet into a cooling fluid.

11. The method according to claim 1, wherein the metal coating comprises a metal or a metal alloy with a melting point below 700° C. and is applied electrolytically on the steel sheet.

12. The method according to claim 11, wherein the metal coating comprises a metal or a metal alloy of tin or zinc.

13. The method according to claim 1, wherein the coated steel sheet is conducted through an inert gas channel and impinged with an inert gas during the recrystallization annealing.

14. The method according to claim 13, wherein at least one induction coil, with which the coated steel sheet is subjected to a recrystallization annealing, is situated around the inert gas channel.

15. The method according to claim 13, wherein the residual oxygen content in the inert gas channel during the recrystallization annealing is at most 20 ppm.

16. The method according to claim 13, wherein the inert gas channel has a temperature-resistant channel wall which has a first opening for introduction of the steel sheet, a second opening for removal of the steel sheet, and at least one supply opening for introduction of an inert gas.

17. The method according to claim 16, wherein the second opening of the inert gas channel is connected with the cooling fluid.

18. The method according to claim 16, wherein the temperature-resistant channel wall is made of a ceramic material.

19. The method according to claim 1, wherein after the recrystallization annealing, the coated steel sheet is quenched at a cooling rate of more than 500 K/s.

* * * * *